United States Patent Office 3,351,669
Patented Nov. 7, 1967

3,351,669
REDUCTION OF METAL CONTENT
OF PHENOLICS
Robert E. Anderson, Midland, and Albert J. Gouin, Bay City, Mich., assignors to The Dow Chemical Company, Midland, Mich., a corporation of Delaware
No Drawing. Filed June 28, 1963, Ser. No. 291,252
7 Claims. (Cl. 260—621)

The present invention concerns the removal of metallic contaminants from phenol and substituted phenols, hereinafter referred to as phenolics. More specifically, the invention concerns a method for reducing the concentration of metal impurities in phenolics by exchange of the impurity, as a metal-halide complex, on a quaternary ammonium anion exchange resin.

Phenolics are quite often contaminated, either during the process of their preparation or during their use in other processes, by small amounts of metallic species. The concentration of these acquired impurities must frequently be reduced to extremely low levels before it is possible, or at least practical, to make further use of the phenolic. Thus, for example, even relatively low concentrations of iron in phenolics may be objectionable because of the coloration subsequently imparted to plastics formulated from such phenolics.

The formation of metallic halide complexes in aqueous solutions containing halide ions is known in the prior art and extensive work has been reported on the exchange of these halide complexes on anion exchange resins from aqueous solutions containing high concentrations of halide ions. See, for example, the work of Kraus and Nelson reported in "Proceedings of the International Conference on the Peaceful Uses of Atomic Energy," vol. 7, 113 (1956). It is also known that small amounts of metallic species in mixed solutions of water and certain organic liquids, e.g. short chain alkanols, containing high concentrations of halide ion may be exchanged on anion exchange resins for the purpose of analytical determination of metal content. See, for example, an article by Yukrihi Yoshino and Yoshimi Kurimuro in the Bull. Chem. Soc. (Japan) 30, 563 (1957).

It has now been discovered, in accordance with the method of the present invention, that appreciable quantities of certain metallic contaminants in phenolics can be removed by exchange of their metal-halide complexes on relatively small amounts of a quaternary ammonium anion exchange resin. The metal-halide complexes are formed by providing very low concentrations of halide ion (i.e., from about 0.001 to about 2 weight percent, phenolic solution basis) and small amounts of water in the contaminated phenolic. The efficiency of the removal of these metallic species, in the form of their halide complexes, is extremely high and reaches a maximum value at a very low halide ion-water concentrations in the contaminated phenolic. The efficiency of this removal of metallic species, in accordance with the present invention, is especially surprising since the kinetics of ion exchange reactions in non-aqueous solvents are, in general, poor.

In the general method of the present invention, metal contaminants present in a phenolic are removed by providing the contaminated phenolic with a minimum halide ion concentration equal to the amount necessary to form the metallic-halide complex, e.g. in the case of ferric ion contamination there must be a minimum of four halide ions present for each ferric ion to form the $FeCl_4^-$ complex ion; providing the phenolic material with up to about 15 weight percent water, based on the total weight of phenolic, halide ion and water, and passing the metal contaminated phenolic-water-halide solution into contact with a quaternary ammonium anion exchange resin. The phenolic material must necessarily be in a liquid state. The temperature employed to effect this liquid state is limited to a maximum value of approximately 150° C. due to the tendency of the anion exchange resin to degrade at higher temperatures.

The halide ion concentration is preferably maintained at less than about 0.5 weight percent of the solution contacting the anion exchange resin. A water concentration below about 5 weight percent, same basis, is similarly preferred. The addition of the halide may be in the form of hydrogen halide or a soluble halide salt. Exchange of the resin with the metallic halide complex is very rapid and small volumes of anion exchange resin are capable of handling large volumes of solution at high flow rates.

Any quaternary ammonium anion exchange resin is suitable for use in the present invention. The four substituents on the quaternary nitrogen atom may be, for example, a polymeric benzyl and three methyl groups or a polymeric benzyl, two methyl groups and an ethanol group.

Metallic impurities which may be removed from phenolics are those which form halide complexes under the conditions employed in the method of the present invention. These metals include V, Cr, Fe, Co, Cu, Zn, Ga, Ge, As, Zr, Mo, Tc, Pb, Cd, In, Sn, Sb, Te, W, Re, Os, Ir, Pt, Au, Ag, Tl, Bi, Po, Th, Pa, and U.

The halide is most conveniently employed in the form of the hydrogen halide HCl, HBr, or HI.

Examples of phenolics which may be treated to remove metallic impurities in accordance with the method of the present invention, include: phenol, o-chlorophenol, p-chlorophenol, m-cresol, resorcinol, o-nitrophenol, m-aminophenol, o-sec-butyl phenol, 2,4,6-tribromophenol, and the like.

The following examples describe completely representative specific embodiments of the present invention. These examples, however, are not to be interpreted as limiting the invention other than as defined in the claims.

*Example 1*

The efficiency of the removal of iron from phenol was demonstrated by the results from the following experiment. A quaternary ammonium anion exchange resin in which the four substituents on the nitrogen atom are a polymeric benzyl and three methyl groups (sold under the trademark "Dowex 1" by The Dow Chemical Company, Midland, Michigan) and which is cross-linked with about 8 weight percent divinylbenzene, was employed. A quantity of three to four milliliters of this resin (50–100 U.S. Standard mesh) in the chloride form was oven dried at 100° C. and placed in a small vertical glass column. Measured amounts of water and HCl were added to phenol contaminated with radioactively tagged iron (isotope 59) in the form of ferric chloride. The resulting solution was then passed through the ion exchange column at about 5 ml./min. and the effluent collected in 3 ml. cuts. The 10th cut was analyzed by measuring the amount of radioactivity which was then compared to the initial activity of the same volume of feed. Table I, below, lists the concentration of iron in parts per million (p.p.m.) and the concentration of HCl and water as weight percent of the total solution.

TABLE I

| | Fe (p.p.m.) | HCl (wt. percent) | $H_2O$ (wt. percent) |
|---|---|---|---|
| Feed | 5 | 0.002 | 0.2 |
| 10th cut | 0.012 | 0.002 | 0.2 |

Comparable or improved efficiencies of iron removal may be attained at water concentrations up to about 15 weight percent water. Examples of results obtained using various water and chloride concentrations are shown in Table II, below.

TABLE II

|  | Fe (p.p.m.) | HCl (wt. percent) | H₂O (wt. percent) |
|---|---|---|---|
| Feed | 4.75 | 0.01 | 5 |
| 10th cut | 0.014 |  |  |
| Feed | 4.3 | 0.01 | 10 |
| 10th cut | 0.001 |  |  |
| Feed | 4.5 | 0.1 | 20 |
| 10th cut | 1.73 |  |  |

However, an increase in HCl concentration above about 0.5 weight percent shows no improvement in efficiency of removal and generally proves detrimental as shown in Table III, below.

TABLE III

|  | Fe (p.p.m.) | HCl (wt. percent) | H₂O (wt. percent) |
|---|---|---|---|
| Feed | 4.3 | 0.01 | 10 |
| 10th cut | 0.001 |  |  |
| Feed | 4.5 | 0.25 | 10 |
| 10th cut | 0.002 |  |  |
| Feed | 4.5 | 1.0 | 10 |
| 10th cut | 0.004 |  |  |

Metallic contaminants may also be removed from contaminated phenolics by the foregoing method wherein a quaternary ammonium anion exchange resin having a polymeric benzyl, two methyl groups and a dodecylamine group as the four substituents on the nitrogen atoms, is substituted for the ion exchange resin employed above.

*Example 2*

Another method for determining the efficiency of the removal in relationship to the variables, i.e. metal contaminant, water, HCl, is by calculation of distribution coefficients. These distribution coefficients, tabulated in Table IV below, are determined from the relationship $$K_D = \frac{\text{Concentration of metal in resin}}{\text{Concentration of metal in phenol}}$$

at equilibrium. This value is calculated from the expression $$K_D = \frac{W_P}{W_R}\left(\frac{C_o}{C_E} - 1\right)$$

$W_P$ = Weight of phenol used
$W_R$ = Weight of dry resin used
$C_o$ = Initial concentration of metal in phenol (p.p.m.)
$C_E$ = Equilibrium concentration of metal in phenol (p.p.m.).

In this equilibrium work a carefully weighed amount of the phenolic containing known concentrations of water, HCl and radioactively tagged metal salt was contacted with an accurately weighed amount of over-dried resin. The equilibration was carried out in a two ounce bottle which was tumbled to ensure thorough mixing. The bottle was kept at a temperature slightly above the melting point of the phenolic by means of infrared heating. A contact time of about 24 hours was used in these experiments. After equilibration the resin was filtered off and a sample of the liquid was weighed and counted. A solution equivalent in radioactivity to the contaminated phenolic before resin contact was maintained as a standard. The relative count of the treated phenolic and this standard gave the residual concentration of metal at equilibrium.

Table IV, below, lists the distribution coefficient values obtained for $Fe^{+++}$, $Co^{++}$ and $Zn^{++}$ at various concentrations of water and HCl and also for $Fe^{+++}$ in a variety of phenolic derivatives. As indicated in the table, several varieties of resin were also employed. The radioactive isotopes $Fe^{59}$, $Co^{60}$ and $Zn^{65}$ were employed to enable the determination of metal content by gamma scintillation counting.

TABLE IV

| Phenolic | Resin | Metal | Percent Water | Percent HCl | $C_o$ (p.p.m.) | $C_E$ (p.p.m.) | $W_P/W_R$ | $K_D$ |
|---|---|---|---|---|---|---|---|---|
| Phenol | 1* | $Co^{+2}$ | 0.2 | 0.005 | 12.0 | 0.804 | 273 | $3.8\times10^3$ |
| Do | 1* | $Co^{+2}$ | 10 | 0.01 | 10.8 | 1.13 | 297 | $2.5\times10^3$ |
| Do | 1* | $Co^{+2}$ | 10 | 0.1 | 11.1 | 0.69 | 269 | $4.4\times10^3$ |
| Do | 1* | $Co^{+2}$ | 10 | 1.0 | 10.8 | 1.00 | 465 | $4.6\times10^3$ |
| Do | 1* | $Co^{+2}$ | 20 | 1.0 | 9.59 | 1.02 | 377 | $3.2\times10^3$ |
| Do | 1* | $Zn^{+2}$ | 0.2 | 0.005 | 13.0 | 0.012 | 407 | $4.4\times10^5$ |
| Do | 1* | $Zn^{+2}$ | 10 | 0.01 | 11.7 | 0.017 | 408 | $2.8\times10^5$ |
| Do | 1* | $Zn^{+2}$ | 10 | 0.1 | 11.7 | 0.017 | 404 | $2.7\times10^5$ |
| Do | 1* | $Zn^{+2}$ | 20 | 0.01 | 10.4 | 0.46 | 411 | $9.2\times10^3$ |
| Do | 1* | $Zn^{+2}$ | 20 | 0.1 | 10.4 | 0.24 | 406 | $1.7\times10^4$ |
| Do | 1* | $Zn^{+2}$ | 20 | 0.5 | 10.4 | 0.38 | 408 | $1.1\times10^4$ |
| Do | 1* | $Zn^{+2}$ | 20 | 1.0 | 10.4 | 0.21 | 410 | $2.1\times10^4$ |
| Do | 1* | $Fe^{+3}$ | 4 | 0.01 | 226 | 0.034 | 250 | $1.7\times10^6$ |
| Do | 2* | $Fe^{+3}$ | 4 | 0.01 | 226 | 0.14 | 250 | $3.7\times10^5$ |
| Do | 3* | $Fe^{+3}$ | 4 | 0.01 | 226 | 0.088 | 250 | $6.4\times10^5$ |
| Do | 4* | $Fe^{+3}$ | 4 | 0.01 | 226 | 0.12 | 250 | $4.7\times10^5$ |
| o-Chlorophenol | 1* | $Fe^{+3}$ | 3 | 0.01 | 115 | 2.3 | 300 | $1.5\times10^4$ |
| p-Chlorophenol | 1* | $Fe^{+3}$ | 3 | 0.01 | 115 | 0.14 | 300 | $2.5\times10^4$ |
| m-Cresol | 1* | $Fe^{+3}$ | 3 | 0.01 | 226 | 20.3 | 300 | $3.0\times10^3$ |
| Resorcinol | 1* | $Fe^{+3}$ | 3 | 0.01 | 226 | 4.1 | 300 | $1.6\times10^4$ |
| o-Nitrophenol | 1* | $Fe^{+3}$ | 3 | 0.01 | 226 | 3.3 | 300 | $2.0\times10^4$ |
| m-Aminophenol | 1* | $Fe^{+3}$ | 3 | 0.01 | 226 | 79.1 | 300 | $5.7\times10^2$ |
| o-sec-Butylphenol | 1* | $Fe^{+3}$ | 3 | 0.01 | 226 | 0.001 | 300 | $1.0\times10^7$ |
| 2,4,6 tribromophenol | 1* | $Fe^{+3}$ | 3 | 0.01 | 226 | 4.29 | 300 | $1.5\times10^4$ |

1* The quaternary ammonium anion exchange resin employed and identified in Example 1.
2* The resin 1* with the exception of approximately 2 weight percent crosslinking with divinylbenzene.
3* The resin 1* with the exception of approximately 12 weight percent crosslinking with divinylbenzene.
4* The resin 1* with the exception that one of the methyl substituents on the nitrogen was replaced with an ethanol group.

*Example 3*

A series of experiments was conducted to study the effect of the presence of organic solvents in the metal-contaminated phenolic-halide-water solution.

In each of these experiments a quantity of 500 grams of phenol was contaminated with 200 p.p.m. of Fe, using $FeCl_3 \cdot 6H_2O$ as the contaminant. $Fe^{59}$ was employed as the radioactive tracer material. The contaminant was dissolved directly in the melted phenol and the only water present was that furnished by the hydrated ferric chloride.

A quantity of 38 grams of phenol was carefully weighed into each of four 2 oz. bottles. To each of these bottles a quantity of 2 grams of an organic solvent (identified in Table V below) was added followed by the addition of 0.2 gram of the resin employed and identified in Example 1. The four bottles were then stoppered and allowed to equilibrate for 18 hours during which time the bottles were gently agitated and the temperature maintained above the melting point of phenol.

At the end of 18 hours, an aliquot of the liquid contents of each bottle was filtered into a weighed test tube and the weight of the aliquot recorded. As indicated by Table V, below, the concentration of the Fe (p.p.m.) in solution was calculated by comparison counting with the original feed material.

TABLE V

| Sample: | $[Fe^{+3}]$-solution after 18 hours, p.p.m. |
|---|---|
| No. 1 (Isopropyl alcohol) | 4 |
| No. 2 (toluene) | 2.4 |
| No. 3 (perchloroethylene) | 0.96 |
| No. 4 (methyl ethyl ketone) | 2.0 |
| Control [1] | 200 |

[1] No ion exchange resin present.

This same procedure was followed utilizing 4 grams of the same organic solvents and 0.4 gram of the same anion exchange resin. The results are tabulated in Table VI, below.

TABLE VI

| Sample: | $[Fe^{+3}]$-solution after 18 hours, p.p.m. |
|---|---|
| No. 5 (isopropyl alcohol) | 6.6 |
| No. 6 (toluene) | 2.6 |
| No. 7 (perchloroethylene) | 8.6 |
| No. 8 (methyl ethyl ketone) | 6.6 |
| Control [1] | -- |

[1] No ion exchange resin present.

We claim:

1. A method for reducing the concentration of metal impurities in phenolics containing ionic metallic species capable of forming metal-halide negatively charged ion complexes, said phenolics being selected from the group consisting of phenol, o-chlorophenol, p-chlorophenol, m-cresol, resorcinol, o-nitrophenol, m-amino-phenol, o-sec-butyl phenol and 2,4,6-tribromophenol, which comprises the step of:
   (1) contacting a solution of said phenolic containing:
      (a) said metallic species,
      (b) from about 0.001 to 2 weight percent, phenolic solution basis, of halide ions selected from the group consisting of chloride, bromide and iodide ions, and
      (c) from about 0.001 to 15 weight percent, phenolic solution basis, of water
   (2) with a quaternary ammonium anion exchange resin; and
   (3) subsequently separating said solution from said resin.

2. The method of claim 1 wherein said metallic species is at least one member of the group of metals consisting of V, Cr, Fe, Co, Cu, Zn, Ga, Ge, As, Zr, Mo, Tc, Pb, Cd, In, Sn, Sb, Te, W, Re, Os, Ir, Pt, Ag, Au, Tl, Bi, Po, Th, Pa, and U.

3. The method of claim 1 wherein said phenolic is phenol.

4. The method of claim 1 wherein said halide ions are present in an amount of from about 0.005 to about 0.5 weight percent.

5. A method for reducing the concentration of iron in phenolics selected from the group consisting of phenol, o-chlorophenol, p-chlorophenol, m-cresol, resorcinol, o-nitrophenol, m-aminophenol, o-sec-butyl phenol, and 2,4,6-tribromophenol, which comprises the steps of:
   (1) contacting a solution of said phenolic containing:
      (a) iron,
      (b) from about 0.001 to 2 weight percent, phenolic solution basis, of halide ions selected from the group consisting of chloride, bromide and iodide ions, and
      (c) from about 0.001 to 15 weight percent, phenolic solution basis, of water
   (2) with a quaternary ammonium anion exchange resin; and
   (3) separating said solution from said resin.

6. The method of claim 5 wherein said halide ions are present in an amount of from about 0.005 to about 0.5 weight percent.

7. The method of claim 5 wherein said phenolic is phenol.

References Cited

Kraus et al., Proceedings of the International Conference on the Peaceful Uses of Atomic Energy, vol. 7, 113 (1956).

Yoshino et al., "Anion Exchange Absorption of Some Metals from Mixed Solvents," Bull. Chem. Soc. (Japan) 30 pp. 563–566 (1957).

LEON ZITVER, *Primary Examiner.*

D. M. HELFER, H. ROBERTS, *Assistant Examiners.*